(12) United States Patent
Ewe et al.

(10) Patent No.: US 11,298,882 B2
(45) Date of Patent: Apr. 12, 2022

(54) CARRIAGE SYNCHRONIZATION OF A MULTI-CARRIAGE THREE-DIMENSIONAL PRINTER

(71) Applicant: HEWLETT-PACKARD DEVELOPMENT COMPANY, L.P., Houston, TX (US)

(72) Inventors: Michael Ewe, Vancouver, WA (US); Eric Collins, Vancouver, WA (US); Donnell D. Daniels, Vancouver, WA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 758 days.

(21) Appl. No.: 16/075,498

(22) PCT Filed: Apr. 21, 2017

(86) PCT No.: PCT/US2017/028898
§ 371 (c)(1),
(2) Date: Aug. 3, 2018

(87) PCT Pub. No.: WO2018/194668
PCT Pub. Date: Oct. 25, 2018

(65) Prior Publication Data
US 2021/0206111 A1    Jul. 8, 2021

(51) Int. Cl.
*B29C 64/393* (2017.01)
*B33Y 30/00* (2015.01)
(Continued)

(52) U.S. Cl.
CPC .......... *B29C 64/393* (2017.08); *B29C 64/205* (2017.08); *B29C 64/236* (2017.08); *B33Y 30/00* (2014.12); *B33Y 50/02* (2014.12)

(58) Field of Classification Search
CPC ......... B29C 64/23; B29C 64/20; B33Y 30/00; B33Y 50/02
(Continued)

(56) References Cited

U.S. PATENT DOCUMENTS 8,778,252 B2    7/2014 Mackie et al.
9,205,690 B2    12/2015 Leavitt et al.
(Continued)

FOREIGN PATENT DOCUMENTS

CN    101114167    1/2008
CN    101677350    3/2010
(Continued)

OTHER PUBLICATIONS

Weiss, "Closed-loop Conlrol of a 3d Printer Gantry", Retrieved from Internet: https://digital.lib.washington.edu/researchworks/bitstream/handle/1773/26048/Weiss_washington_0250O_13644.pdf, 2014, 71 pages.

*Primary Examiner* — Abul Azad
(74) *Attorney, Agent, or Firm* — HP Inc. Patent Development

(57) ABSTRACT

An example three-dimensional printing system includes a first carriage, a second carriage, and a synchronization controller. The synchronization controller is coupled to the first carriage and the second carriage to synchronize movements of the first carriage and the second carriage. The synchronization controller is to avoid interference between the first carriage and the second carriage.

17 Claims, 7 Drawing Sheets

(51) Int. Cl.
*B33Y 50/02* (2015.01)
*B29C 64/236* (2017.01)
*B29C 64/205* (2017.01)

(58) Field of Classification Search
USPC ........................................................ 700/118
See application file for complete search history.

(56) References Cited

U.S. PATENT DOCUMENTS

| | | | | |
|---|---|---|---|---|
| 10,780,628 | B2* | 9/2020 | Padgett | B29C 64/295 |
| 2014/0292926 | A1* | 10/2014 | Aruga | B41J 25/308 |
| | | | | 347/37 |
| 2015/0097308 | A1 | 4/2015 | Batchelder et al. | |
| 2017/0100898 | A1 | 4/2017 | Cofler et al. | |
| 2017/0334193 | A1* | 11/2017 | Voina | B41J 2/04505 |
| 2018/0133971 | A1* | 5/2018 | Vilajosana | G05D 23/27 |
| 2018/0253080 | A1* | 9/2018 | Meess | B29C 64/245 |
| 2019/0039303 | A1* | 2/2019 | Barnes | B33Y 30/00 |
| 2019/0111619 | A1* | 4/2019 | Schalk | B29C 64/236 |

FOREIGN PATENT DOCUMENTS

| | | |
|---|---|---|
| CN | 103029665 | 4/2013 |
| WO | 2015177598 A1 | 11/2015 |
| WO | 2017023281 A1 | 2/2017 |

* cited by examiner

CARRIAGE SYNCHRONIZATION OF A MULTI-CARRIAGE THREE-DIMENSIONAL PRINTER

BACKGROUND

Three-dimensional (3D) printers typically operate with carriages performing various tasks. For example, one carriage may deposit material in layers, and another carriage may apply energy to selectively fuse the material.

BRIEF DESCRIPTION OF THE DRAWINGS

For a more complete understanding of various examples, reference is now made to the following description taken in connection with the accompanying drawings in which.

DETAILED DESCRIPTION

Various examples described herein provide printer carriage synchronization in multi-carriage 3D printers to increase printing speed and to avoid catastrophic collisions. Various examples include a system having a first carriage to deliver a build material to a staging zone, a second carriage to spread the build material over a build zone, and a third carriage to apply agents to the build material over the build zone. In some examples, a synchronization controller may be coupled, either directly or indirectly (e.g., through carriage drive systems), to the first, second and third carriages to in order to synchronize their movement for increased speed and to avoid high-speed collisions which could damage the 3D printer.

In one example, the movements of the second carriage and the third carriage are co-axial in a common plane and the movements of the first carriage are in the same plane and perpendicular to the movements of the second and third carriages.

For simplicity and illustrative purposes, the present disclosure is described by referring mainly to examples thereof. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure. As used herein, the terms "a" and "an" are intended to denote at least one of a particular element, the term "includes" means includes but not limited to, the term "including" means including but not limited to, and the term "based on" means based at least in part on.

Figure 1:
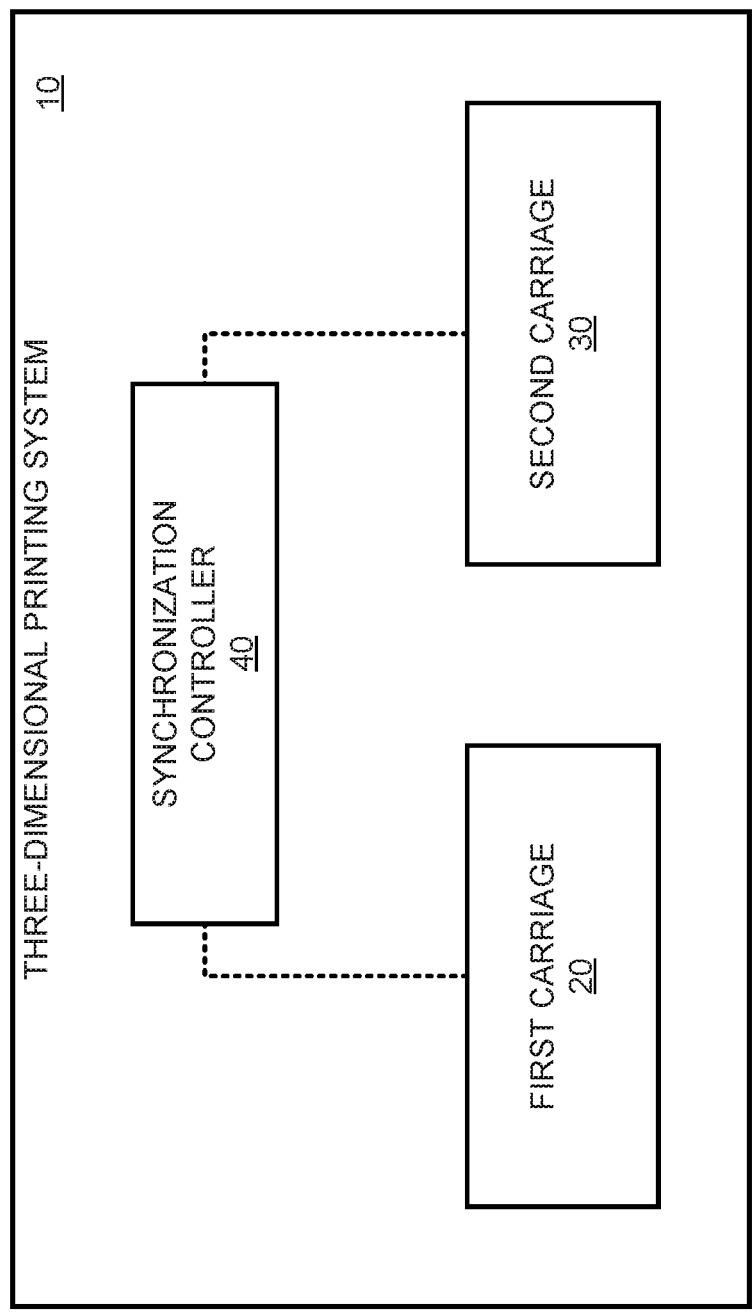
FIG. 1 illustrates a block diagram of an example system employing printer carriage synchronization.

Referring now to the Figures, FIG. 1 illustrates a block diagram of an example system employing printer carriage synchronization. In the example of FIG. 1, an example three-dimensional printing system 10 includes a first carriage 20 and a second carriage 30. As described in greater detail below, various examples of three-dimensional printing systems, such as the example three-dimensional printing system 10 of FIG. 1, may include carriages to perform various functions of 3D printing. For example, the first carriage 20 and the second carriage 30 may perform various functions such as delivering a build material to a staging zone, spreading the build material over a build zone, fusing the build material, or applying agents to the build material over the build zone.

The example three-dimensional printing system 10 of FIG. 1 further includes a synchronization controller 40. The synchronization controller 40 is coupled to the first carriage 20 and the second carriage 30. In this regard, the synchronization controller 40 may control or coordinate movements of the first carriage 20 and the second carriage 30. In various examples, the synchronization controller 40 is provided to synchronize movements of the first carriage 20 and the second carriage 30 and to avoid interference between the first carriage 20 and the second carriage 30. Various examples of the synchronization controller 40 are described below with reference to the various figures.

Figure 2:
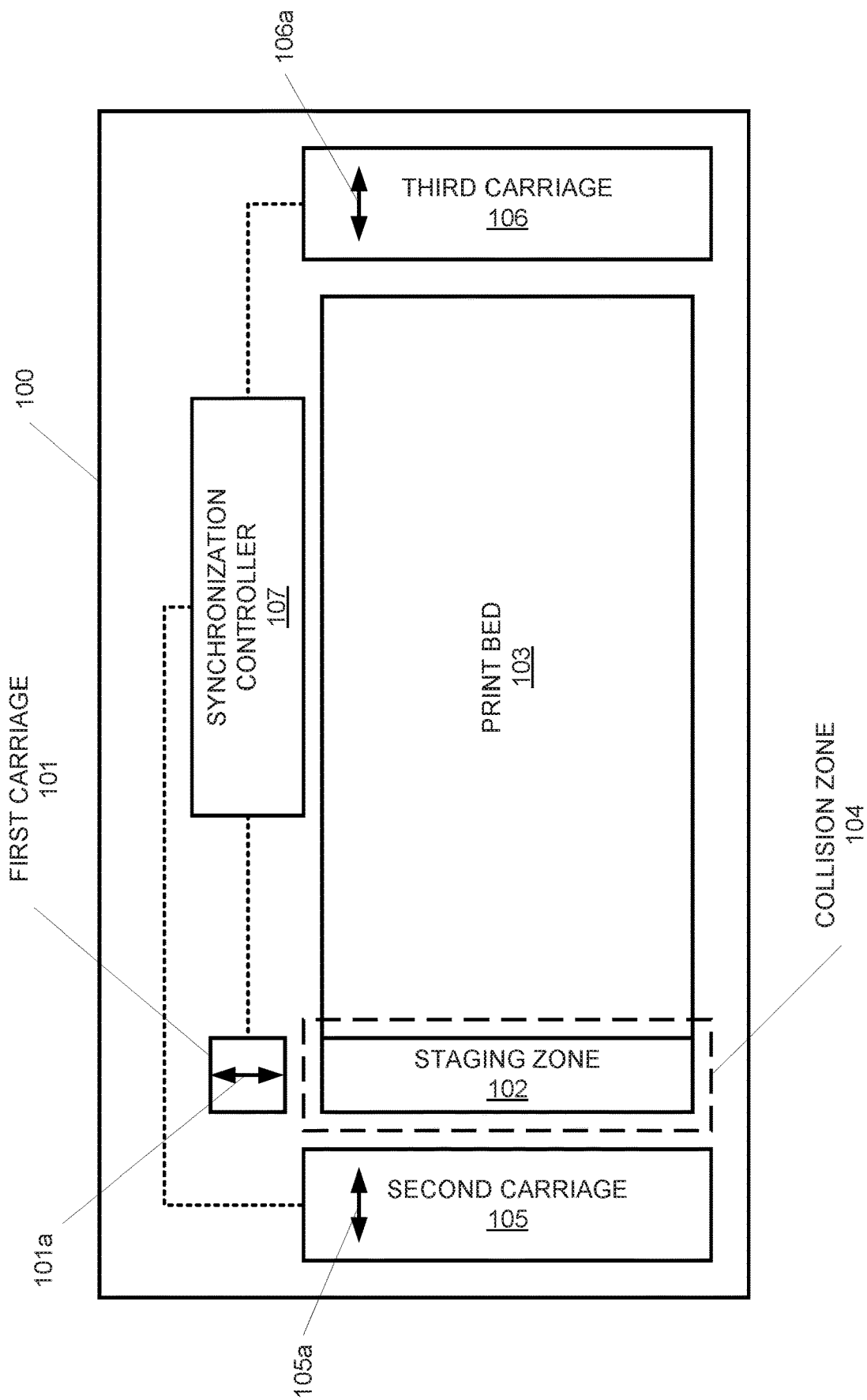
FIG. 2 illustrates a block diagram of another example system employing printer carriage synchronization.

Referring now to FIG. 2, there is illustrated a block diagram of an example system 100 employing printer carriage synchronization. The example system includes a first carriage 101, also referred to herein as a ribbon carriage 101, which operates to deliver a "build material" to a staging zone 102. In one example, the build material may be a powdered thermoplastic or any other material suitable for thermal fusing. In operation, the ribbon carriage 101 may be connected to a source of the build material (not shown) and may deposit a ribbon of build material to the staging zone 102 in sufficient quantity to spread over a print bed 103 at a predetermined thickness, as described below. As illustrated by the directional arrow 101a, the movement of the ribbon carriage 101 is constrained to traversing the staging zone 102 in two directions. In one example, the ribbon carriage 101 may traverse the staging zone 102 in one pass, depositing the build material in the staging zone 102, and then dwell at a location clear of a "collision zone" 104 defined by the area of a second carriage 105, also referred to herein as a fusing carriage 105. The collision zone 104 is so-named because the ribbon carriage 101 and the fusing carriage 105 should not be in the collision zone 104 at the same time. In one example, the ribbon carriage 101 may traverse the staging zone 102, depositing the build material in the staging zone 102, and then return to its starting location clear of the collision zone 103.

In one example, after the build material has been deposited and the ribbon carriage 101 has cleared the collision zone 103, the fusing carriage 104 moves from its initial position across the staging zone 102 and across the print bed 103 while spreading the build material over the print bed 103 at some predetermined thickness appropriate for a layer of 3D printing. The fusing carriage 105 may include a spreading device such as a blade or a roller (not shown) to spread the build material over the print bed 103. The spreading device may be adjustable to control the thickness of the build material. The fusing carriage 105 may also include one or more energy sources (not shown) such as heat lamps with controllable intensity capable of both heating the build material and fusing the build material.

In one example, as part of a print bed preparation process, the fusing carriage 105 may make several passes over the print bed 103, applying energy to pre-heat the build material to an appropriate temperature for printing operations. As illustrated by the directional arrows 105a, the movements of the fusing carriage 105 are constrained to linear movements perpendicular the movements of the ribbon carriage 101.

Also included in FIG. 2 is a third carriage 106, also referred to herein as a printing carriage 106. As illustrated by the directional arrows 106a, the movements of the printing carriage are constrained to linear movements perpendicular to the movements of the ribbon carriage 101 and co-axial with the movements of the fusing carriage 105. In various examples, printing carriage 106 may include a plurality of nozzles (not shown) capable of delivering inks and agents to the build material to achieve desired characteristics in the printed object. In various examples, inks may be used to impart color to the build material and/or or to increase energy absorption. A variety of agents may be applied by the printing carriage, such as fusing agents, detailing agents and agents to control physical properties such as: surface properties, translucency, strength and stiffness, thermal or electrical conductivity, and elasticity of the final printed part. The details of these inks and agents are beyond the scope of this disclosure and, therefore, are not described in detail here.

In various examples, the movements of the ribbon carriage 101, the fusing carriage 105, and the printing carriage 106 are controlled by a synchronization controller 107, operating through servo-controlled drive systems (not shown in FIG. 2) to independently control the movements of the three carriages. In some examples, the drive systems may be shaft drive or belt drive systems. The synchronization controller 107 may be any type of suitable computing device such as a general-purpose processor, microcontroller, special purpose logic, or the like. In various examples, the positions of the carriages may be determined by position encoders (not shown in FIG. 2). The position encoders may be any type of encoder suitable for the respective drive mechanism and physical environment. For example, the position encoders may be rotary or linear, absolute or incremental, and the encoding method may be optical, conductive, magnetic, inductive, capacitive, etc.

After the print bed 103 is prepared, as described above, the printing process may begin. For clarity, the basic printing process is first described in a sequence of operations without regard to the specific timing of the operations regarding synchronization or collision avoidance, to be described in detail subsequently. In one example (with reference to FIG. 2), the fusing carriage 105 moves to the far right of the print bed 103, adjacent to printing carriage 106. Next, the fusing carriage 105 and the printing carriage 106 traverse the print bed 103 in close proximity across the print bed 103 from right to left while the fusing carriage 105 applies energy to the build material to maintain its proper temperature for reaction with the inks and agents being applied to the build material by the printing carriage 106 ("printing traverse").

In this example, the fusing carriage 105 may move into and through the staging area 102 so the printing carriage 106 can apply its inks and agents to the entire print bed 103. Next, the printing carriage 106 and the fusing carriage 105 move back across the print bed 103 while the fusing carriage applies fusing energy to the build material ("fusing traverse"). In one example, the printing carriage 106 may apply additional inks and agents ahead of the fusing carriage 105 as they move together across the print bed 103. As the fusing carriage 105 moves across the collision zone 104 as it begins its fusing operation, the synchronization controller 107 monitors its position and moves the ribbon carriage 101 into the staging zone 102 just as the fusing carriage 105 exits the collision zone 104. The ribbon carriage 101 then traverses the staging zone 102, depositing another ribbon of build material before returning to its starting position ("deposit traverse").

Continuing the example printing process, after the printing carriage 106 and the fusing carriage 105 complete their fusing traverse of the print bed 103, the printing carriage 106 remains parked (with reference to FIG. 2) at the far right, clear of the print bed 103. The fusing carriage 105 then returns to its starting position at the far left in FIG. 2. In one example, the fusing carriage 105 may apply additional heating or fusing energy to the build material during its return to the starting position. In this example, the spreading device in the fusing carriage 105 is retracted while the fusing carriage 105 traverses the staging zone 102, effectively "stepping over" the ribbon of build material. Once the fusing carriage 105 clears the staging zone 102, the spreading device is returned to its spreading position while the print bed 103 is lowered to make room for the next layer of build material ("bed drop"). After the print bed 103 is lowered to its new position, the fusing carriage 105 traverses the staging zone 102 and the print bed from left to right (in FIG. 2), spreading and preheating the build material in a new layer ("spreading traverse"). This sequence of operations including a "printing traverse," a "fusing traverse," a "deposit traverse" a "bed drop" and a "spreading traverse" repeats until the printed part is completed.

Figure 3:
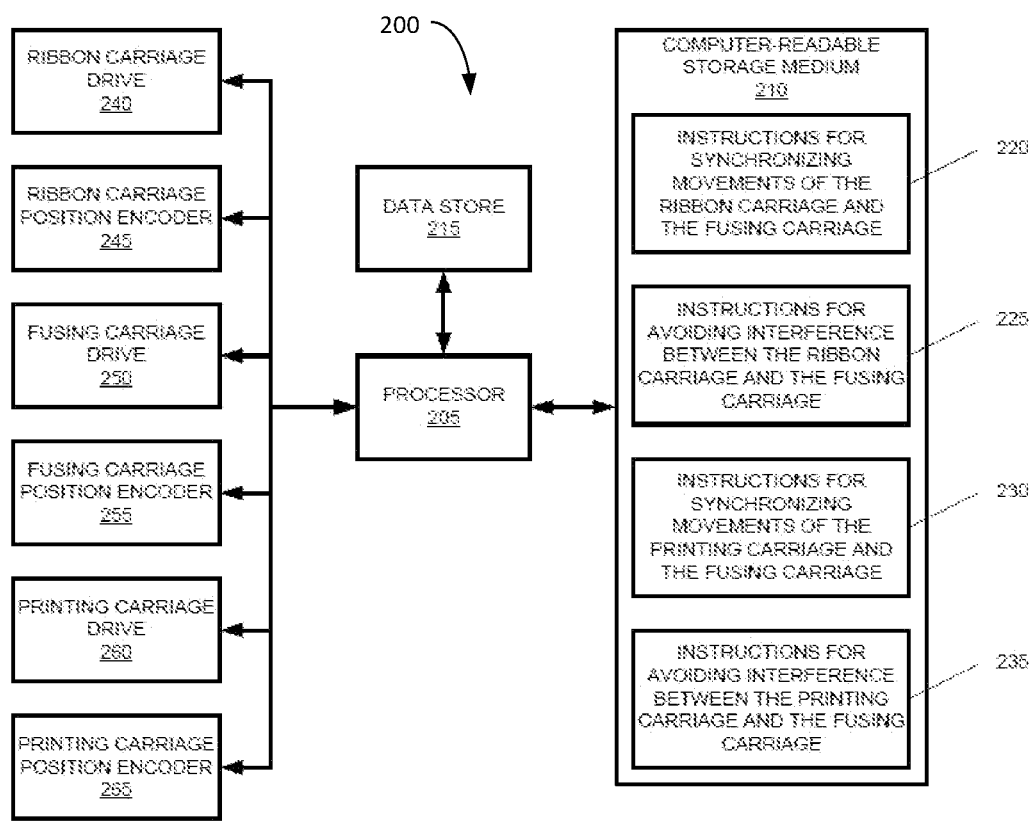
FIG. 3 illustrates a block diagram of an example system with a computer-readable storage medium including instructions executable by a processor for printer carriage synchronization.

Referring now to FIG. 3, there is illustrated a block diagram of an example system with a non-transitory computer-readable storage medium including instructions executable by a processor for printer carriage synchronization. The example system 200 includes a processor 205 coupled with a non-volatile computer-readable storage medium 210 and a data store 215. The non-transitory computer-readable storage medium 202 includes example instructions 220, 225, 230 and 235 that are executable by the processor 205 to perform various functionalities described herein. The data store 215 may contain data files corresponding to the build of a 3D printed part.

In various examples, the non-transitory computer-readable storage medium 210 and the data store 215 may be any of a variety of storage devices including, but not limited to, random-access memory (RAM), dynamic RAM (DRAM), static RAM (SRAM), flash memory, read-only memory (ROM), programmable ROM (PROM), electrically erasable PROM (EEPROM), or the like. In various examples, the processor 205 may be a general-purpose processor, special purpose logic, or the like.

System 200 may also include a ribbon carriage drive 240 and a ribbon carriage position encoder 245 associated with the ribbon carriage 101, a fusing carriage drive 250 and a fusing carriage position encoder 255 associated with the fusing carriage 105, and a printing carriage drive 260 and a printing carriage position encoder 265 associated with the printing carriage 106, all coupled to and controller by the processor 205. In various examples the position encoders 245, 255, and 265 may be high-speed, quad state encoders, capable of taking measurements hundreds of times per second, which the processor may use to determine position, velocity and acceleration in real-time.

As described above, the example 3D printing processes use coordination among the movements of the ribbon carriage 101, the fusing carriage 105, and the printing carriage 106. In various examples, in order to perform printing at high speed without collisions between the carriages, the processor executes instructions 220 for synchronizing the movements of the ribbon carriage, instructions 225 for avoiding interference between the ribbon carriage and the fusing carriage, instructions 230 for synchronizing the movements of the fusing carriage and the printing carriage, and instructions 235 for avoiding interference between the fusing carriage and the printing carriage.

In some examples, as described above, the ribbon carriage 101 and the fusing carriage 105 may be in the vicinity of the collision zone 104 during various operations. In some examples, the processor 205 executes instructions 220 to perform operations that synchronize the movements of the ribbon carriage 101 and the fusing carriage 105 during normal operation, and instructions 225 to avoid interference between the ribbon carriage 101 and the fusing carriage 105 under abnormal or anomalous conditions.

Figure 4:
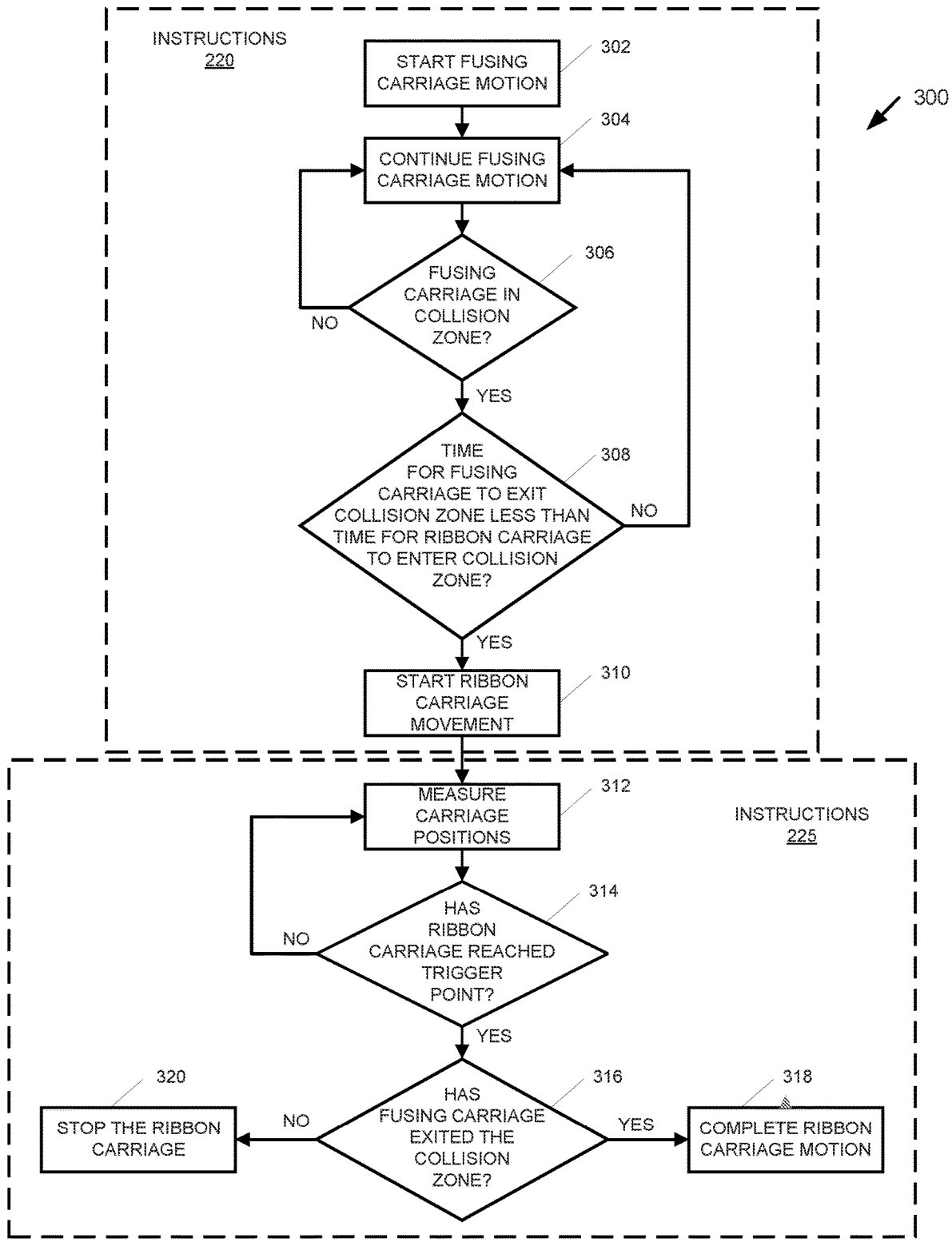
FIG. 4 is a flowchart illustrating an example process for printer carriage synchronization.

FIG. 4 is a flowchart illustrating an example process 300 performed by processor 205 by executing instructions 220 and 225. Under instructions 220, the process begins at operation 302 when the motion of the fusing carriage is started. At operation 304, the processor continues moving the fusing carriage 101 and monitors the position of the fusing carriage 105 using fusing carriage position encoder 255 (position encoder 255). At operation 306, the processor then determines if the fusing carriage 101 in in the collision zone 102. If the fusing carriage is not in the collision zone 102, the process loops back to operation 304. If the fusing carriage is in the collision zone, then the processor performs calculations at operation 308 based on its readings from the position encoder 255 and the known dynamics of the ribbon carriage 101 and its drive system 240. In one example, the readings from the position encoder 255 may be used to determine the velocity of the fusing carriage 105 and to predict when it will exit the collision zone 102. Data for the dynamics of the ribbon carriage 101 and its drive system 240 may reside in the data store 215 as calibration data on the acceleration and slew rate of the ribbon carriage 101. In operation 308, the processor determines if the time for the fusing carriage 105 to exit the collision zone 102 is less than the time for the ribbon carriage 101 to enter the collision zone 102. It the determination at operation 308 is NO, movement of the ribbon carriage 101 is delayed and the process returns to operation 304 where the movement of the fusing carriage 105 is continued. If the determination at operation 308 is YES, then the processor initiates movement of the ribbon carriage 101 at operation 310 so that the ribbon carriage 101 enters the collision zone 102 just after the fusing carriage 105 exits the collision zone 102.

Figure 5:
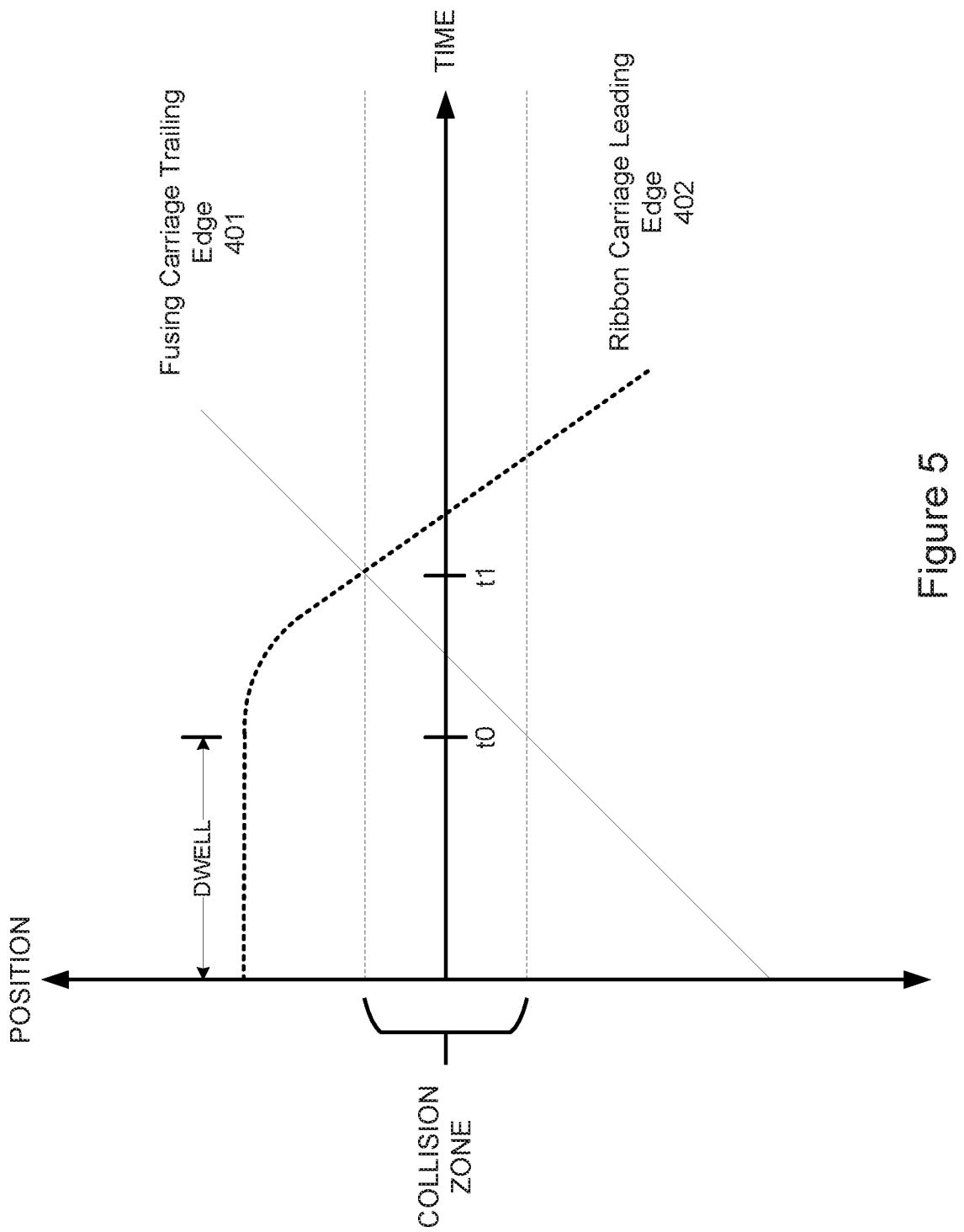
FIG. 5 is a graphical illustration of an example process executed by a processor for printer carriage synchronization.

This example process is illustrated graphically in FIG. 5, where the trajectory of the trailing edge of the fusing carriage 105 through the collision zone 102 is plotted as line 401. The slope of line 401 represents the velocity of fusing carriage 105 and can be calculated by processor 205 using data from position encoder 255, as described above. The position and trajectory of the ribbon carriage 101 is represented by curve 402. It will be apparent from FIG. 5 that the motion of the ribbon carriage 101 is started after time t0 in order to avoid a collision with the fusing carriage 105 before t1.

Instructions 220 for performing operations 302-310 address normal or expected functioning of the ribbon carriage 101 and the fusing carriage 105. However, if the fusing carriage 105 fails to act as commanded by the processor 205, then additional operations may be used to avoid a collision between ribbon carriage 101 and fusing carriage 105. In one example, the fusing carriage drive 250 could fail while the fusing carriage 105 is still in the collision zone 102. Instructions 225 address such anomalous conditions.

Returning now to FIG. 4, under instructions 225, the process 300 continues at operation 312, where the processor 205 continuously measures the positions of the ribbon carriage 101 and the fusing carriage 105 by reading their respective position encoders 245 and 255. At operation 314, the processor 205 determines if the ribbon carriage 101 has reached a "trigger point" defined as a point beyond which the ribbon carriage 101 cannot be kept out of the collision zone 102 based on its velocity and the dynamics of its drive system. If the determination is NO, then the process returns to operation 312 where the positions of the ribbon carriage 101 and the fusing carriage 102 are continuously measured. If the determination is YES, then the process continues at operation 316, where the processor 105 determines if the fusing carriage 105 has exited the collision zone, by reading it position encoder 255. If the determination is YES, then the motion of the ribbon carriage into the collision zone 102 is completed at operation 318. If the determination is NO, then the ribbon carriage is halted short of the collision zone in operation 320, when error handling mechanisms can be invoked.

In some examples, as described above, the printing carriage 106 and the fusing carriage 105 may be in close proximity during various operations (e.g., during the printing traverse and the fusing traverse as described earlier) or the fusing carriage 105 may be moving toward a stationary printing carriage 106 (e.g., during bed preparation or a spreading traverse as described earlier). In various examples, the processor 205 executes instructions 230 to perform operations that synchronize the movements of the printing carriage 106 and the fusing carriage 105 during normal operation, and instructions 235 to avoid interference between the printing carriage 106 and the fusing carriage 105 under abnormal or anomalous conditions.

Figure 6:
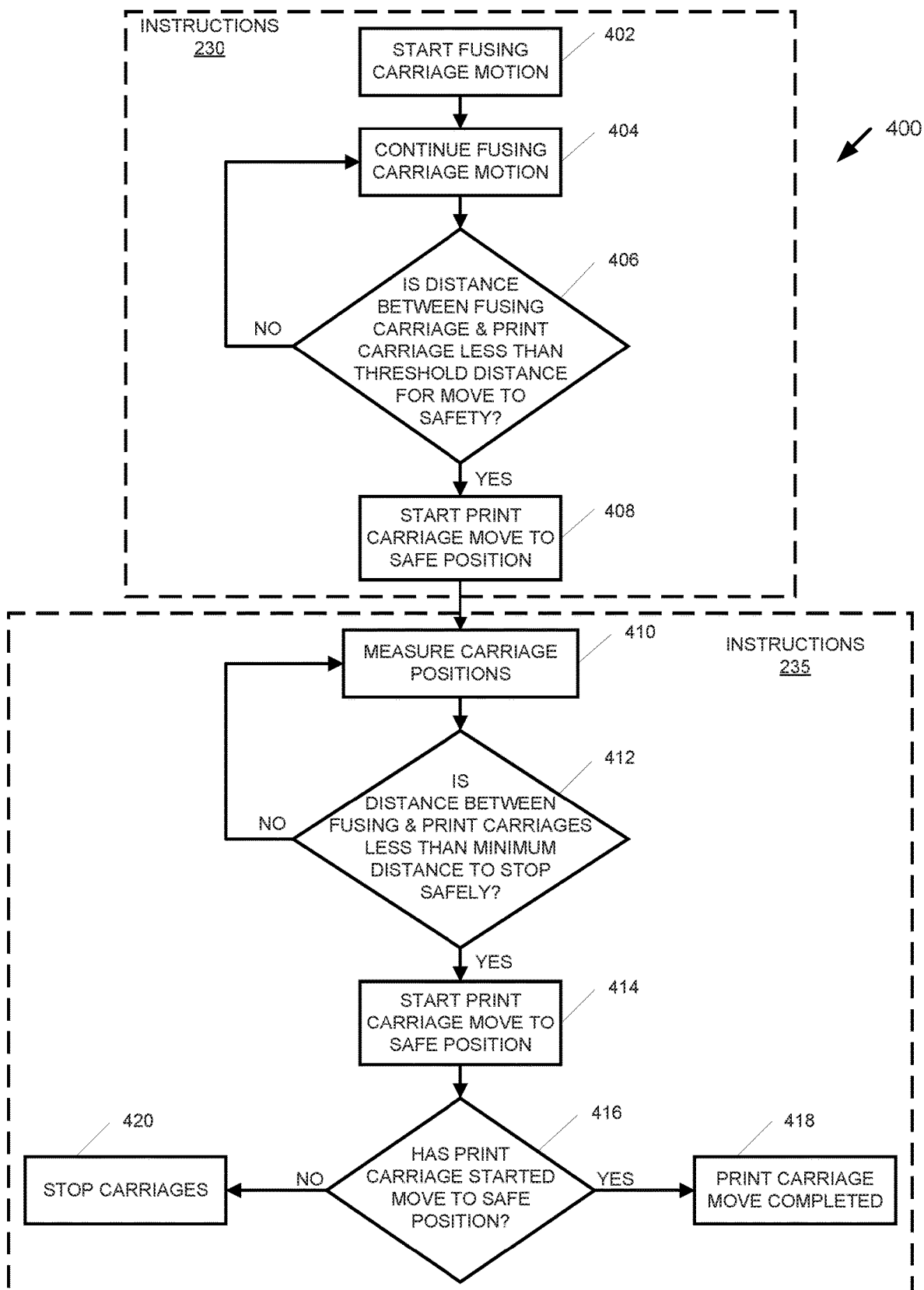
FIG. 6 is a flowchart illustrating an example process executed by a processor for printer carriage synchronization.

FIG. 6 is a flowchart illustrating an example process 400 performed by processor 205 by executing instructions 230 and 235. Under instructions 230, the process begins at operation 402 when the motion of the fusing carriage is started. At operation 404, the processor continues moving the fusing carriage 105 and monitors the position of the fusing carriage 105 by reading fusing carriage position encoder 255 (position encoder 255). At operation 406, the processor measures the position of the printing carriage 106 by reading printing carriage position encoder 265 (position encoder 265) and determines if the distance between the fusing carriage 105 and the printing carriage 106 is less than a threshold distance, where the threshold distance is a distance the allows time for the printing carriage to move to a safe location. In one example, the safe location may be a designated service area or docking area reserved for the printing carriage.

If the determination is NO, then the process returns to operation 404 and the movement of the fusing carriage continues. If the determination is YES, then the processor executes operation 408 to move the printing carriage to a safe location.

Instructions 230 for performing operations 402-408 address normal or expected functioning of the printing carriage 106 and the fusing carriage 105. However, if either the printing carriage 106 or the fusing carriage 105 fail to act as commanded by the processor 205, then additional operations may be used to avoid a collision between printing carriage 106 and fusing carriage 105. Instructions 235 address such anomalous conditions.

Returning now to FIG. 6, under instructions 235, the process 400 continues at operation 410, where the processor 205 continuously measures the positions of the printing carriage 106 and the fusing carriage 105 by reading their respective position encoders 265 and 255. At operation 412, the processor 205 determines if the distance between the fusing carriage 105 and the printing carriage 106 is less than a minimum distance to stop safely. Such a condition might arise, for example, if the printer carriage stopped moving during a traverse of the print bed 103. If the determination is NO, then the process loops back to operation 410 where the positions of the carriages are continuously monitored. If the determination is YES, then the processor executes operation 414 to start the printing carriage 106 in a move toward a safe location. At operation 416, the processor determines if the printing carriage has started a move to the safe location. If the determination is yes, the move is completed by the processor at operation 418. If the determination is NO, then the processor stops all carriage motion at operation 420, when other error handling activities can be invoked.

Figure 7:
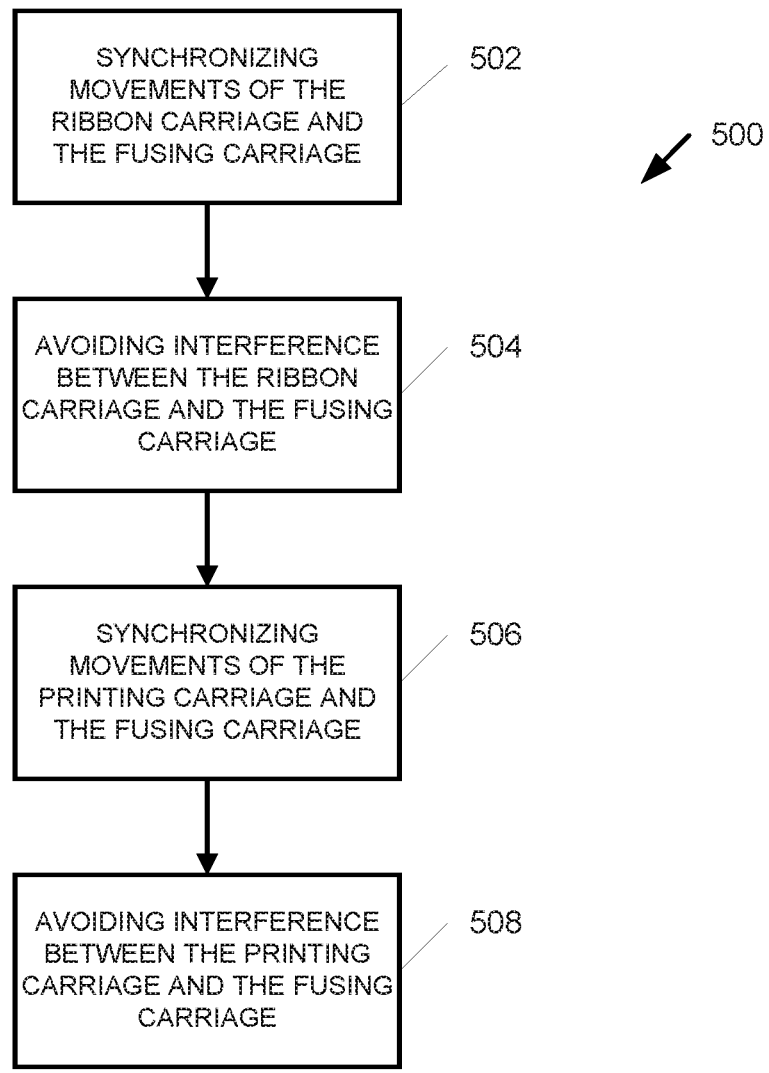
FIG. 7 is a detailed flowchart illustrating additional portions of the example process of FIG. 4.

Referring now to FIG. 7, a flowchart illustrates an example method 500 for printer carriage synchronization. The example method 500 may be implemented in a variety of manners, such as in the synchronization controller 107 in the example system 100 of FIG. 2 or processor 205 in the example system 200 of FIG. 3.

The example method 500 may include operations for synchronizing movements of the ribbon carriage 101 and the fusing carriage 105 (block 502) as previously described with respect to the example system 200 of FIG. 3 and operations 302-310 of example process 300 of FIG. 4. The example method 500 may further include operations for avoiding interference between the ribbon carriage 101 and the fusing carriage 105 (block 504) as previously described with respect to the example system 200 of FIG. 3 and operations 312-320 of example process 300 of FIG. 4.

The example method 500 may further include operations for synchronizing the movement of the printing carriage 106 and the fusing carriage 105 (block 506) as previously described with respect to the example system 200 of FIG. 3 and operations 402-408 of example process 400 of FIG. 6. The example method 500 may further include operations for avoiding interference between the printing carriage 106 and the fusing carriage 105 (block 508) as previously described with respect to the example system 200 of FIG. 3 and operations 410-420 of example process 400 of FIG. 6.

The foregoing description of various examples has been presented for purposes of illustration and description. The foregoing description is not intended to be exhaustive or limiting to the examples disclosed, and modifications and variations are possible in light of the above teachings or may be acquired from practice of various examples. The examples discussed herein were chosen and described in order to explain the principles and the nature of various examples of the present disclosure and its practical application to enable one skilled in the art to utilize the present disclosure in various examples and with various modifications as are suited to the particular use contemplated. The features of the examples described herein may be combined in all possible combinations of methods, apparatus, modules, systems, and computer program products.

It is also noted herein that while the above describes examples, these descriptions should not be viewed in a limiting sense. Rather, there are several variations and modifications which may be made without departing from the scope as defined in the appended claims.

What is claimed is:

1. A three-dimensional printing system, comprising:
a first carriage moveable along a first linear path;
a second carriage moveable along a second, different linear path, the first and second carriages structured to distribute build material for the printing system;
a number of encoders to output an indication of a position of each of the first and second carriages along the first and second linear paths respectively, wherein the first and second linear paths intersect; and
a synchronization controller to receive output of the number of encoders to synchronize movements of the first carriage and the second carriage and to avoid interference between the first carriage and the second carriage where the first and second linear paths intersect;
wherein to avoid interference between the first carriage and the second carriage, the synchronization controller stops the second carriage if the second carriage passes a trigger position while the first carriage is in a collision zone.

2. The three-dimensional printing system of claim 1, wherein the first carriage is to deliver a build material to a staging zone; and
the second carriage is to spread the build material over a build zone and to fuse the build material,
wherein the first carriage moves in a direction perpendicular to the second carriage, the second carriage structured to move through the staging zone and the build zone.

3. The three-dimensional printing system of claim 2, further comprising:
a third carriage to apply agents to the build material over the build zone,
wherein the synchronization controller is further in control of movement of the third carriage and is to synchronize movements of the first, second and third carriages and to avoid interference between different ones of the carriages.

4. The three-dimensional printing system of claim 3, wherein the synchronization controller is further to move the second and third carriages together over the build zone while preventing collision between the second and third carriages moving together.

5. The three-dimensional printing system of claim 4, wherein the synchronization controller is further to move the second and third carriages together over the build zone in a first direction to complete a printing traverse of the build zone and then in a second, opposite direction to complete a fusing traverse of the build zone, the second and third carriages moving next to each other during the printing and fusing traverses.

6. The three-dimensional printing system of claim 1, wherein to synchronize the movements of the first carriage and the second carriage, the synchronization controller determines that a time for the second carriage to exit a collision zone is less than a time for the first carriage to enter the collision zone.

7. The three-dimensional printing system of claim 1, wherein to synchronize the movements of the first carriage and the second carriage, the synchronization controller calculates and maintains a separation between the first carriage and the second carriage based on current position measurements from the number of encoders.

8. The three-dimensional printing system of claim 7, wherein to avoid interference between the first carriage and the second carriage, the synchronization controller predicts future locations of the first carriage and second carriage based on plurality of position measurements from the number of encoders.

9. A method, comprising:
moving a first carriage across a staging zone to form a ribbon of build material across the staging zone;
moving a second carriage through the staging zone and into a build zone to distribute the ribbon of build material as a layer of build material in the build zone, the second carriage moving in a direction perpendicular to the movement of the first carriage, a collision zone existing at an intersection of a path of the first carriage and a path of the second carriage;
determining that the first carriage is in the collision zone;
determining if a first time for the first carriage to exit the collision zone is less than a second time for a second carriage to enter the collision zone; and
if the first time is less than the second time, starting movement of the second carriage; else
if the first time is not less than the second time, delaying movement of the second carriage to avoid a collision between the first and second carriages in the collision zone; and
to further avoid interference between the first carriage and the second carriage, stopping the second carriage if the second carriage passes a trigger position while the first carriage is in the collision zone.

10. The method of claim 9, further comprising:
determining if a distance between the first carriage and the second carriage is less than a threshold distance to safely stop the carriages; and
if the distance between the first carriage and the second carriage is less than the threshold distance, start moving the third carriage to a safe position.

11. The method of claim 9, further comprising retracting a spreading device of the second carriage to avoid disturbing a ribbon of build material in the staging zone when the second carriage returns across the staging zone to a starting position.

12. The method of claim 9, further comprising halting the first carriage when the second carriage fails to move as commanded by a synchronization controller.

13. The method of claim 9, with a synchronization controller, timing movement of the first carriage to enter the staging zone just as the second carriage leaves the collision zone.

14. A non-transitory computer-readable storage medium encoded with instructions executable by a processor of a computing system, the computer-readable storage medium comprising instructions to:
synchronize movements of a first carriage and a second carriage that are distributing build material in a three-dimensional printing system, wherein the first and second carriages move along different, intersecting linear paths;
avoid interference between the first carriage and the second carriage based on encoder data indicating a current location of the first and second carriages to prevent a collision between the first and second carriages;
synchronize movements of the second carriage and a third carriage; and
avoid interference between the second carriage and the third carriage based on encoder data indicating a current location of the second and third carriages to prevent a collision between the second and third carriages; and
stopping the second carriage if the second carriage passes a trigger position while the first carriage is in a collision zone.

15. The non-transitory computer-readable storage medium of claim 14, wherein to synchronize the movements of the first and second carriages, the non-transitory machine-readable storage medium further includes instructions to:
determine that the first carriage is in a collision zone;
determine if a first time for the first carriage to exit the collision zone is less than a second time for the second carriage to enter the collision zone; and if the first time is less than the second time,
start movement of the second carriage; else, if the first time is not less than the second time,
delay movement of the second carriage.

16. The non-transitory computer-readable storage medium of claim 14, wherein to synchronize the movements of the second and third carriages, the non-transitory machine-readable storage medium further includes instructions to:
determine if a distance between the second carriage and a third carriage is less than a threshold distance to safely stop the carriages; and if the distance between the second carriage and a third carriage is less than the threshold distance,
move the third carriage toward a safe position; else
continue to monitor the distance between the second and third carriages.

17. The non-transitory computer-readable storage medium of claim 16, wherein to avoid interference between the first carriage and the second carriage, the non-transitory machine-readable storage medium further includes instructions to:
determine if the third carriage is moving toward the safe position; and if the third carriage is not moving toward the safe position,
stop the second and third carriages; else
continue to move the third carriage toward the safe position.

* * * * *